(12) United States Patent
Crowne

(10) Patent No.: US 12,025,482 B2
(45) Date of Patent: Jul. 2, 2024

(54) CONTAMINATION DETECTION FOR OPTICAL PRESSURE SENSORS

(71) Applicant: Simmonds Precision Products, Inc., Vergennes, VT (US)

(72) Inventor: David H. Crowne, Weybridge, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 174 days.

(21) Appl. No.: 17/668,188

(22) Filed: Feb. 9, 2022

(65) Prior Publication Data
US 2023/0251121 A1    Aug. 10, 2023

(51) Int. Cl.
*G01F 23/16*    (2006.01)
*G01F 23/14*    (2006.01)
*G01F 25/20*    (2022.01)
*G01N 21/31*    (2006.01)

(52) U.S. Cl.
CPC .............. *G01F 23/14* (2013.01); *G01F 25/20* (2022.01); *G01N 21/31* (2013.01)

(58) Field of Classification Search
CPC ..... G01L 7/086; G01L 9/0077; G01L 9/0079; G01L 11/02; G01L 11/025; G01F 23/164; G01F 23/292; G01F 25/20; G01N 21/45; G01N 2021/458; G01H 9/004; G01H 9/006
See application file for complete search history.

(56) References Cited

U.S. PATENT DOCUMENTS

| | | | |
|---|---|---|---|
| 6,198,293 B1 * | 3/2001 | Woskov | G01B 15/02 324/637 |
| 6,820,488 B2 | 11/2004 | Lenzing et al. | |
| 10,823,753 B2 | 11/2020 | Seidel et al. | |
| 2013/0105002 A1 * | 5/2013 | Enos | F24H 9/2014 137/334 |
| 2015/0177132 A1 * | 6/2015 | Pechstedt | G01N 33/22 356/517 |
| 2018/0329206 A1 * | 11/2018 | Cohen | B08B 7/028 |

FOREIGN PATENT DOCUMENTS

JP    2007035389 A  *  2/2007  ........ H01M 8/04231

* cited by examiner

*Primary Examiner* — Herbert K Roberts
(74) *Attorney, Agent, or Firm* — Kinney & Lange, P.A.

(57) ABSTRACT

A system includes an optical pressure sensor. A controller is operatively connected to receive input from the optical pressure sensor. An output connection is operatively connected to communicate output data from the controller. The controller includes machine readable instructions configured to cause the controller to receive data from an optical pressure sensor, detect an accumulation of contaminant on the optical pressure sensor, and initiate a corrective action through the output connection in response to detecting the accumulation of contaminant.

16 Claims, 3 Drawing Sheets

CONTAMINATION DETECTION FOR OPTICAL PRESSURE SENSORS

BACKGROUND

1. Field

The present disclosure relates to optical pressure sensors, and more particularly to optical pressure sensors such as for use in liquid level/quantity measuring.

2. Description of Related Art

Optical pressure sensors can be used to measure hydrostatic pressure in a liquid. This could be useful for applications like liquid level/quantity sensing in applications like fuel tanks of aircraft. For optically based fuel quantity measurement using pressure, ice growth on the sensor diaphragm could lead to erroneous measurements. The ice might lead to a reading that is false, but is in range that would be expected for a reasonable liquid level/quantity. The ice and associated error is therefore difficult to detect. Moreover, ice is not the only contaminant that can accumulate on a diaphragm of an optical pressure sensor that can lead to measurement errors.

The conventional techniques have been considered satisfactory for their intended purpose. However, there is an ever present need for improved systems and methods for detecting and accounting for ice and other contaminants accumulating on optical pressure sensors. This disclosure provides a solution for this need.

SUMMARY

A method includes receiving data from an optical pressure sensor and detecting an accumulation of contaminant on the optical pressure sensor. The method includes initiating a corrective action in response to detecting the accumulation of contaminant.

Detecting an accumulation of contaminant on the optical pressure sensor can include detecting the accumulation of contaminant on a diaphragm of the optical pressure sensor, wherein the optical pressure sensor is a Fabry-Perot sensor. Detecting accumulation of contaminant on the optical pressure sensor can include receiving wavelength domain data from the optical pressure sensor, converting the wavelength domain data to frequency domain data, and detecting a frequency peak in the frequency domain data corresponding to the accumulated contaminant. Converting the wavelength domain data to frequency domain data can include performing a fast Fourier transform (FFT) on the wavelength domain data.

Detecting a frequency peak in the frequency domain data corresponding to presence of the accumulated contaminant can include detecting:
- a first peak frequency corresponding to a resonant frequency of a first optical path in the optical pressure sensor from a fiber through a first optical interface between the fiber and a main sensor body, reflected from a second optical interface between a cavity and the main sensor body back into the fiber;
- a second peak frequency corresponding to a resonant frequency of a second optical path in the optical pressure sensor from the fiber, through the main sensor body and through the cavity, reflected from a third optical interface between the cavity and a diaphragm back into the fiber;
- a third peak frequency corresponding to a resonant frequency of a third optical path in the optical pressure sensor from the fiber, through the main sensor body, the cavity, and the diaphragm, and reflected off of a fourth optical interface between the diaphragm and the accumulated contaminant; and
- a fourth peak frequency corresponding to a resonant frequency of a fourth optical path in the optical pressure sensor from the fiber, through the main sensor body, the cavity, the diaphragm, and the accumulated contaminant, and reflected from a fifth optical interface between the accumulated contaminant and an ambient environment of the optical pressure sensor, wherein the fourth peak frequency is the frequency peak in the frequency domain data corresponding to presence of the accumulated contaminant.

Initiating corrective action can include determining liquid level and/or liquid quantity in a container without using data from the optical pressure sensor. Determining liquid level and/or liquid quantity in the container without using data from the optical pressure sensor can include using data from one or more non-contaminated sensors. Initiating corrective action can include signaling for servicing by scavenging water out of a container in which the optical pressure sensor is used for liquid level and/or liquid quantity measurements.

The accumulated contaminant can be at least partially transparent to wavelengths transmitted by an optic fiber of the optical pressure sensor. The accumulated contaminant can include at least one of water ice, microbial growth, mineral deposits, and/or soot.

A system includes an optical pressure sensor. A controller is operatively connected to receive input from the optical pressure sensor. An output connection is operatively connected to communicate output data from the controller. The controller includes machine readable instructions configured to cause the controller to receive data from an optical pressure sensor, detect an accumulation of contaminant on the optical pressure sensor, and initiate a corrective action through the output connection in response to detecting the accumulation of contaminant. The machine readable instructions can cause the controller to perform any of the methods disclosed herein.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
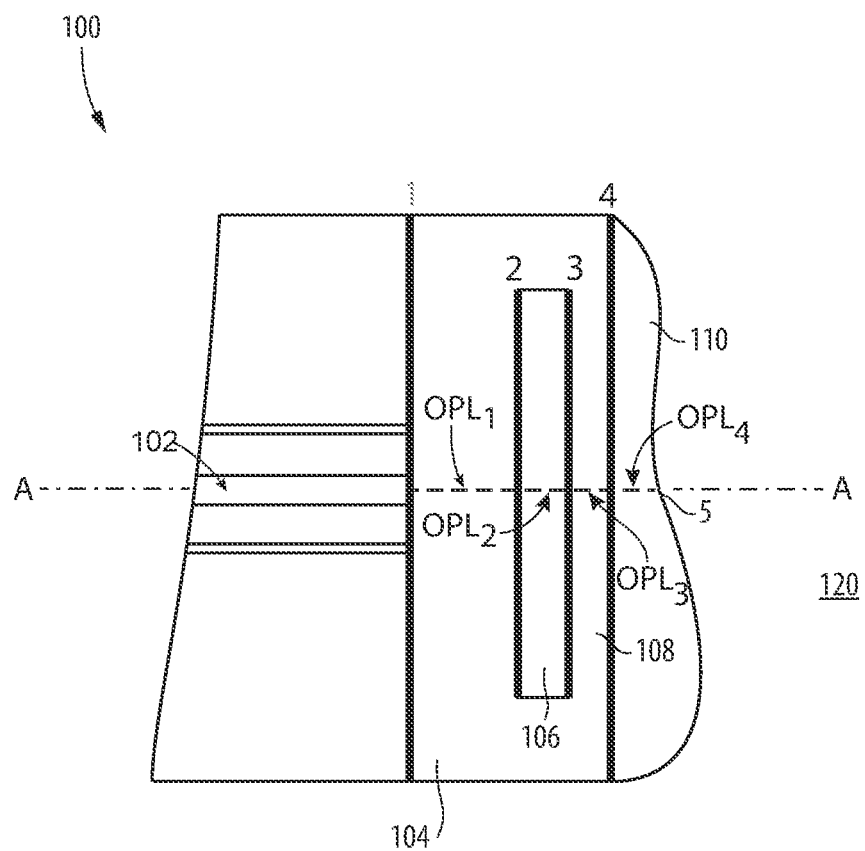
FIG. 1 is a schematic cross-sectional side elevation view of an embodiment of an optical pressure sensor constructed in accordance with the present disclosure, showing accumulated contaminant on the diaphragm.

Reference will now be made to the drawings wherein like reference numerals identify similar structural features or aspects of the subject disclosure. For purposes of explanation and illustration, and not limitation, a partial view of an embodiment of a optical pressure sensor in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to detect accumulated contaminants on diaphragms of optical pressure sensors such as Fabry-Perot sensors.

Figure 2:
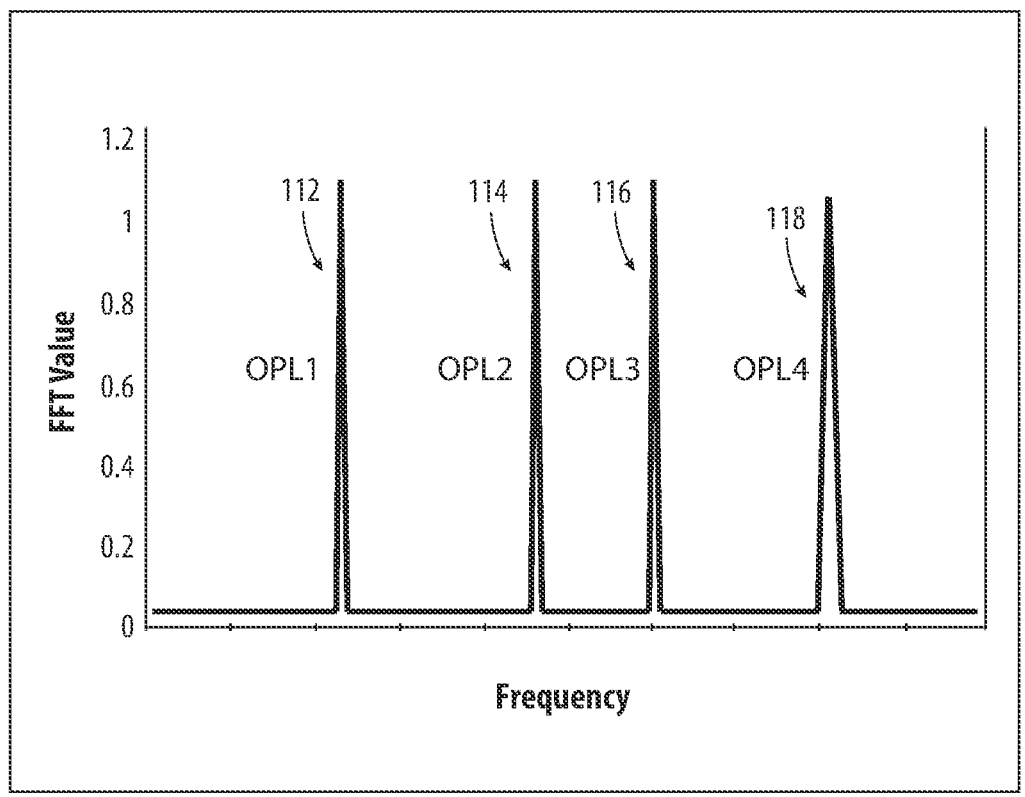
FIG. 2 is a frequency domain graph showing frequency peaks for normal operation of a sensor of FIG. 1, plus an additional frequency peak corresponding to the accumulated contaminant.

The sensor 100 is a Fabry-Perot optical pressure sensor that includes an optic fiber 102 that defines a longitudinal axis A and is optically coupled to a main sensor body 104. The main sensor body 104 has an internal cavity 106 defined therein, and a pressure-sensitive diaphragm 108 is defined on the axially outward portion of the main sensor body 102. The sensor 100 can be used for pressure sensing. Illumination passes to and from the fiber 102. Wavelength domain data from the optical signals returning through the fiber 102 can be transformed into frequency domain data such as shown in FIG. 2, e.g. using a fast Fourier transform (FFT). Peak frequencies in the frequency domain data can be used to detect pressure acting on the diaphragm 108 from outside of the sensor 100. As explained in greater detail below, it is also possible to detect accumulated contaminants 110 on the diaphragm 108 using peak frequencies detected in the frequency domain data.

With continued reference to FIGS. 1 and 2, a first peak frequency 112 in the frequency domain data from the sensor 100 corresponds to a resonant frequency of a first optical path length (OPL1). OPL1 is the optical path length along the axis A from the interface 1 between the fiber 102 and the main sensor body 104. The full optical path for optical signals related to OPL1 passes from the fiber 102 through the first optical interface 1, and is reflected from the second optical interface 2 between the cavity 106 and the main sensor body 104 and back into the fiber 102. The second peak frequency 114 corresponding to a resonant frequency of a second optical path length (OPL2) is related to an optical path from the fiber 102, through the main sensor body 104 and through the cavity 104, which is reflected from the third optical interface 3 between the cavity 104 and the diaphragm 108 back into the fiber 3. Changes in the frequency of this frequency peak 114 indicate changes in ambient pressure acting on the diaphragm 108. As the diagram 108 deflects under pressure, the resonant wavelengths/frequencies change and the frequency associated with the peak 114 can be correlated to an ambient pressure value over a range of ambient pressures and frequencies of the peak 114.

With continued reference to FIGS. 1 and 2, the third peak frequency 116 corresponds to a resonant frequency of a third optical path length, OPL3. OPL3 is related to an optical path from the fiber 102, through the main sensor body 104, the cavity 106, and the diaphragm 108, which is reflected off of a fourth optical interface 4 between the diaphragm 108 and the accumulated contaminant 110. A fourth peak frequency 118 corresponds to a resonant frequency of a fourth optical path OPL4. OPL4 is related to an optical path from the fiber 102, through the main sensor body 104, the cavity 106, the diaphragm 108, and through the accumulated contaminant 110, and which is reflected from a fifth optical interface 5 between the accumulated contaminant 110 and an ambient environment 120 of the optical pressure sensor 100. The fourth peak frequency 118 is the frequency peak in the frequency domain data corresponding to presence of the accumulated contaminant 110. The lack of a fourth peak frequency 118 in the frequency domain data from a sensor 100 indicates little or no accumulated contaminant 110 on the diaphragm 108. The presence of a fourth peak frequency 118 (located to the right of the other peak frequencies 112, 114, and 116 in FIG. 2) indicates presence of an accumulated contaminant 110. The actual frequency of the peak 118 (resonant wavelengths) will provide some coarse measure of thickness of accumulated contaminant 110. Material opacity in the optical interrogation wavelength range will determine the magnitude of the peak 118.

The main sensor body, including the diaphragm 108, can be made of any suitable material such as sapphire. The accumulated contaminant needs to be at least partially transparent to wavelengths transmitted by the fiber 102. These wavelengths can be tuned for a given application based on what type of contaminants can be expected to accumulate in said application. The accumulated contaminants in various applications could include ice (frozen water), microbial growth, mineral deposits, soot, and/or any other materials that might adhere to and/or build up on the sensor diaphragm 108.

Figure 3:
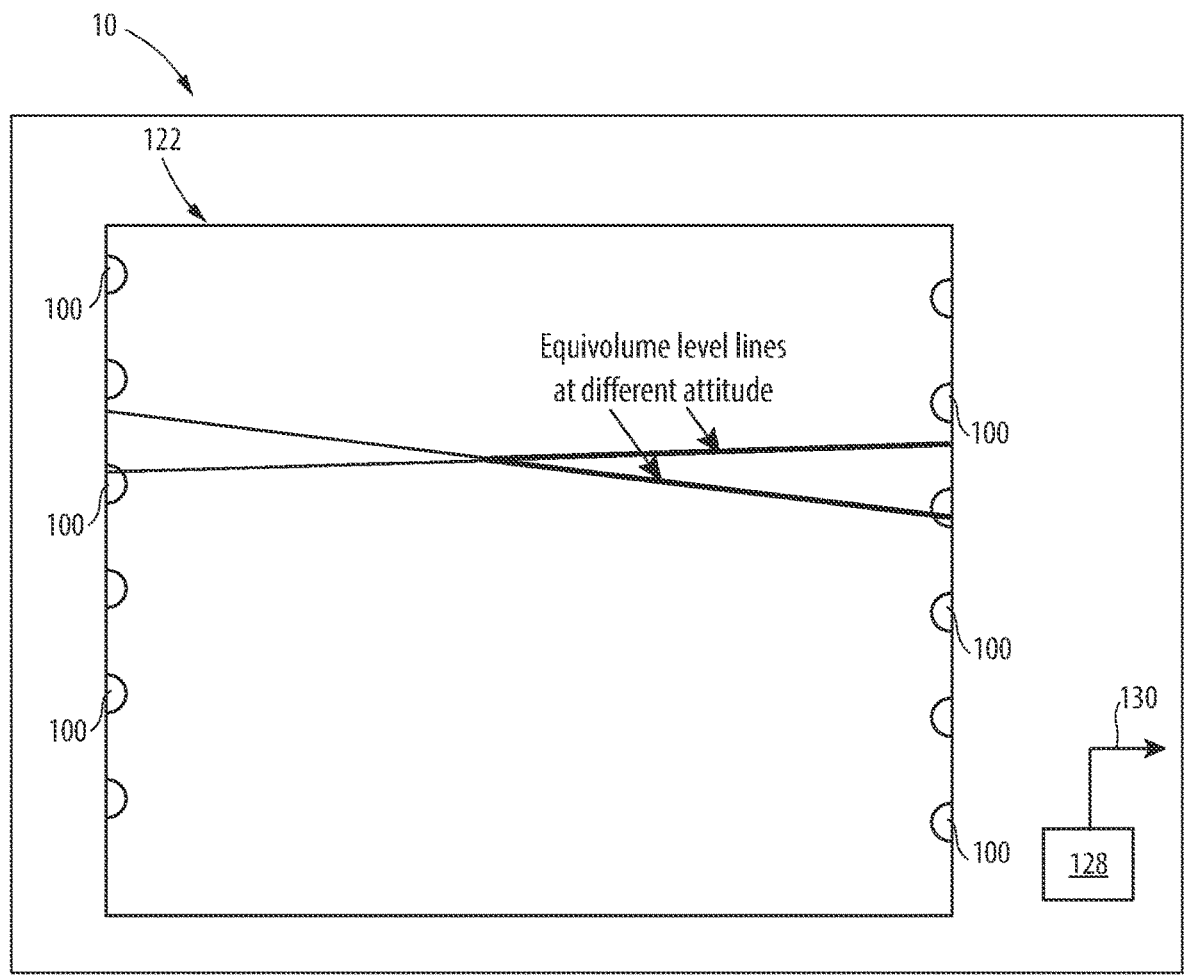
FIG. 3 is a schematic view of the system using sensors like the one shown in FIG. 1, showing how the sensors can be used to determine liquid level and/or liquid quantity in a container.

With reference now to FIG. 3, a system 10 includes one or more optical pressure sensors 100 as described above with reference to FIGS. 1-2. A controller 128 is operatively connected to receive input from the optical pressure sensor (s) 100. An output connection 130 is operatively connected to communicate output data from the controller 128. The controller includes machine readable instructions configured to cause the controller to receive data from an optical pressure sensor 100, detect an accumulation of contaminant 110 on the optical pressure sensor(s) 100, and initiate a corrective action through the output connection 130 in response to detecting the accumulation of contaminant. The machine readable instructions can cause the controller to perform any of the methods disclosed herein.

With continued reference to FIG. 3, the system 10 an associated methods can be used in determining at least one of liquid level and liquid quantity in a container 122 based upon pressures the sensor(s) 100 and based on known locations of the optical sensor(s) 100 in the container 122. Given the location or depth of the sensor 100 in container 122, and the pressure acting on the senor 100, calculations can be made to determine the liquid level in the container 100. The greater the number of sensors 100 distributed in the container 100, the greater the resolution can be of measurements of the liquid level/quantity in the container 122. If the sensors 100 are distributed not only in the depth direction, but also across the span of the container 122, then corrections can be made for the angle of the surface of the liquid relative to the orientation of the container 122, e.g. to correct for attitude of an aircraft or other vehicle in the case of fuel level/quantity measurements. Two different liquid surface angles are shown in FIG. 4. Those skilled in the art will readily appreciate that a three-dimensional distribution of sensors 100 throughout a three-dimensional container 122 will allow for three dimensional liquid surface determination for correction/accuracy of liquid level/quantity measurements. It is also possible to determine the relative attitude of the liquid surface and the container 122 using angle sensors, e.g. outside the container 122, to determine the angle of the container 122 relative to the direction of gravity and/or any other body forces acting on the liquid, such as forces from momentum as the container 122 moves. The controller 128 can be operatively connected to the network of sensors 100 for making the measurements described above. For sake of clarity in the drawings, the connections between individual sensors 100 and the controller 128 are not depicted in FIG. 4.

The methods disclosed herein include initiating a corrective action in response to detecting the accumulation of contaminant 110 (as labeled in FIG. 1) on one or more of the sensors 100. Initiating corrective action includes determining liquid level and/or liquid quantity in a container 122 without using data from the optical pressure sensor 100 that has accumulated containment 110. This includes using data from one or more non-contaminated sensors 100 for the liquid level and/or liquid quantity determination. Initiating corrective action includes signaling for servicing by scavenging water out of a container 122. For example, aboard an aircraft, the controller 128 detecting an accumulated contaminant 110 such as frozen water ice on one or more of the sensors 110 can make determinations of liquid level and/or liquid quantity in the fuel tank 122 without using the sensor(s) 100 on which ice is detected. The controller 128 can use output connection 130 to signal for crew or automated systems to scavenge water out of the fuel tank 122, since water in the fuel tank 122 is indicated by presence of ice on the one or more contaminated sensors 100.

The ability to detect which sensors 100 have accreted or accumulated contaminants 110 is beneficial because the flexibility of the diaphragm 108 (labeled in FIG. 1) is affected by accumulated contaminants 110 which affects its ability to deflect under pressure. Bad pressure measurements can be detected and corrective action can be taken as a result. Systems and methods as disclosed herein can also provide the benefit of the capability to detect relatively thin layers of contaminants (1 µm to 200 µm for example) because those values could cause false but within range pressure readings that might otherwise go undetected. Systems and methods as disclosed herein can also detect thicker layers of contamination that result in the sensor being unresponsive to pressure changes at all. There is no known accurate technique for accurately detecting response degradation of other types of pressure sensors that employ different sensing technologies (MEMS, for example). The diagnostic capability disclosed herein therefore becomes a discriminating feature that enables high accuracy/high integrity pressure measurement systems using Fabry-Perot type optical pressure sensors, which have the added benefit that there is no need for electrical current inside a fuel tank. The fuel measurement application described herein is just one of many potential uses for this technique.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer/machine readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The methods and systems of the present disclosure, as described above and shown in the drawings, provide for detecting accumulated contaminants on diaphragms of optical pressure sensors such as Fabry-Perot sensors. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method comprising:
   receiving data from an optical pressure sensor;
   detecting an accumulation of contaminant on the optical pressure sensor; and
   initiating a corrective action in response to detecting the accumulation of contaminant, wherein initiating corrective action includes determining liquid level and/or liquid quantity in a container without using data from the optical pressure sensor, wherein determining liquid level and/or liquid quantity in the container without using data from the optical pressure sensor includes using data from one or more non-contaminated sensors at a different depth or depths in the container from the optical pressure sensor.

2. The method as recited in claim 1, wherein detecting an accumulation of contaminant on the optical pressure sensor includes detecting the accumulation of contaminant on a diaphragm of the optical pressure sensor, wherein the optical pressure sensor is a Fabry-Perot sensor.

3. The method as recited in claim 1, wherein detecting accumulation of contaminant on the optical pressure sensor includes receiving wavelength domain data from the optical pressure sensor, converting the wavelength domain data to frequency domain data, and detecting a frequency peak in the frequency domain data corresponding to the accumulated contaminant.

4. The method as recited in claim 3, wherein converting the wavelength domain data to frequency domain data includes performing a fast Fourier transform (FFT) on the wavelength domain data.

5. The method as recited in claim 3, wherein detecting a frequency peak in the frequency domain data corresponding to presence of the accumulated contaminant includes detecting:
   a first peak frequency corresponding to a resonant frequency of a first optical path in the optical pressure sensor from a fiber through a first optical interface between the fiber and a main sensor body, reflected from a second optical interface between a cavity and the main sensor body back into the fiber;
   a second peak frequency corresponding to a resonant frequency of a second optical path in the optical pressure sensor from the fiber, through the main sensor body and through the cavity, reflected from a third optical interface between the cavity and a diaphragm back into the fiber;
   a third peak frequency corresponding to a resonant frequency of a third optical path in the optical pressure sensor from the fiber, through the main sensor body, the cavity, and the diaphragm, and reflected off of a fourth optical interface between the diaphragm and the accumulated contaminant; and
   a fourth peak frequency corresponding to a resonant frequency of a fourth optical path in the optical pressure sensor from the fiber, through the main sensor body, the cavity, the diaphragm, and the accumulated contaminant, and reflected from a fifth optical interface between the accumulated contaminant and an ambient environment of the optical pressure sensor, wherein the fourth peak frequency is the frequency peak in the frequency domain data corresponding to presence of the accumulated contaminant.

6. The method as recited in claim 1, wherein initiating corrective action includes signaling for servicing by scavenging water out of a container in which the optical pressure sensor is used for liquid level and/or liquid quantity measurements.

7. The method as recited in claim 1, wherein the accumulated contaminant is at least partially transparent to wavelengths transmitted by an optic fiber of the optical pressure sensor.

8. The method as recited in claim 1, wherein the accumulated contaminant includes at least one of water ice, microbial growth, mineral deposits, and/or soot.

9. A system comprising:
   an optical pressure sensor;
   a controller operatively connected to receive input from the optical pressure sensor; and
   an output connection operatively connected to communicate output data from the controller, wherein the controller includes machine readable instructions configured to cause the controller to:
   receive data from the optical pressure sensor;

detect an accumulation of contaminant on the optical pressure sensor; and initiate a corrective action through the output connection in response to detecting the accumulation of contaminant, wherein initiating corrective action includes determining liquid level and/or liquid quantity in a container without using data from the optical pressure sensor, wherein determining liquid level and/or liquid quantity in the container without using data from the optical pressure sensor includes using data from one or more non-contaminated sensors at a different depth or depths in the container from the optical pressure sensor.

10. The system as recited in claim 9, wherein detecting an accumulation of contaminant on the optical pressure sensor includes detecting the accumulation of contaminant on a diaphragm of the optical pressure sensor, wherein the optical pressure sensor is a Fabry-Perot sensor.

11. The system as recited in claim 9, wherein detecting accumulation of contaminant on the optical pressure sensor includes receiving wavelength domain data from the optical pressure sensor, converting the wavelength domain data to frequency domain data, and detecting a frequency peak in the frequency domain data corresponding to the accumulated contaminant.

12. The system as recited in claim 11, wherein converting the wavelength domain data to frequency domain data includes performing a fast Fourier transform (FFT) on the wavelength domain data.

13. The system as recited in claim 11, wherein detecting a frequency peak in the frequency domain data corresponding to presence of the accumulated contaminant includes detecting:

a first peak frequency corresponding to a resonant frequency of a first optical path in the optical pressure sensor from a fiber through a first optical interface between the fiber and a main sensor body, reflected from a second optical interface between a cavity and the main sensor body back into the fiber;

a second peak frequency corresponding to a resonant frequency of a second optical path in the optical pressure sensor from the fiber, through the main sensor body and through the cavity, reflected from a third optical interface between the cavity and a diaphragm back into the fiber;

a third peak frequency corresponding to a resonant frequency of a third optical path in the optical pressure sensor from the fiber, through the main sensor body, the cavity, and the diaphragm, and reflected off of a fourth optical interface between the diaphragm and the accumulated contaminant; and a fourth peak frequency corresponding to a resonant frequency of a fourth optical path in the optical pressure sensor from the fiber, through the main sensor body, the cavity, the diaphragm, and the accumulated contaminant, and reflected from a fifth optical interface between the accumulated contaminant and an ambient environment of the optical pressure sensor, wherein the fourth peak frequency is the frequency peak in the frequency domain data corresponding to presence of the accumulated contaminant.

14. The system as recited in claim 9, wherein initiating corrective action includes signaling for servicing by scavenging water out of a container in which the optical pressure sensor is used for liquid level and/or liquid quantity measurements.

15. The system as recited in claim 9, wherein the accumulated contaminant is at least partially transparent to wavelengths transmitted by an optic fiber of the optical pressure sensor.

16. The system as recited in claim 9, wherein the accumulated contaminant includes at least one of water ice, microbial growth, mineral deposits, and/or soot.

* * * * *